United States Patent

Ohntrup et al.

[15] 3,641,413
[45] Feb. 8, 1972

[54] PHOTOELECTRIC MOTOR CONTROL

[72] Inventors: Frederick F. Ohntrup, Plymouth Meeting, Pa.; John P. Truemper, West Helena; Billy C. Smith, Forrest City, both of Ark.

[73] Assignee: Eaton Yale & Towne Inc., Cleveland, Ohio

[22] Filed: Dec. 16, 1970

[21] Appl. No.: 98,789

[52] U.S. Cl. ........................................................318/480
[51] Int. Cl. ....................................................H02p 7/14
[58] Field of Search ..................318/257, 480; 250/237

[56] References Cited

UNITED STATES PATENTS

| | | | |
|---|---|---|---|
| 2,331,144 | 10/1943 | Sitter | 318/480 X |
| 2,921,408 | 1/1960 | Leblic | 318/480 X |
| 3,366,862 | 1/1968 | Beck et al. | 318/480 X |

*Primary Examiner*—Bernard A. Gilheany
*Assistant Examiner*—W. E. Duncanson, Jr.
*Attorney*—Teagno & Toddy

[57] ABSTRACT

A control for an electric motor for producing a first control signal for controlling the speed of the motor and a second control signal for controlling the direction of rotation of the motor includes a pair of photocells connected in series across a power supply, a light source for illuminating the photocells, a movable mask for controlling the intensity of illumination on each of the photocells, a pair of switches and a pair of actuator members one of which is associated with each of the switches. An output terminal is connected between the series-connected photocells for producing the first control signal, the magnitude of which controls the speed of the motor, and is dependent upon the resistance of the photocells and hence the intensity of illumination acting thereon. The switches produce the second control signal. Initial movement of one of the actuating members effects activation of its associated switch to thereby produce the second control signal and further movement of the actuating member effects movement of the mask to thereby control the intensity of illumination acting on the photocells so as to control the magnitude of the first control signal. Thus, movement of one of the actuating members controls the direction of rotation of the motor associated with the control and the magnitude of movement of the actuating member controls the speed of the motor.

10 Claims, 6 Drawing Figures

PATENTED FEB 8 1972

INVENTORS
FREDERICK F. OHNTRUP
JOHN P. TRUEMPER
BILLY C. SMITH
BY Teagno and Toddy
ATTORNEYS

INVENTORS
FREDERICK F. OHNTRUP
JOHN P. TRUEMPER
BILLY C. SMITH

BY Jeagne and Toddy
ATTORNEYS

PHOTOELECTRIC MOTOR CONTROL

The present invention relates to a control for direction and speed control circuits of an electric motor, and more particularly to a novel manually operated control of the class that will apply a signal controlling the direction in which the motor is to operate and a further signal of variable magnitude controlling motor speed.

For many years, it was thought most satisfactory to utilize a conventional type of potentiometer in controls for motors despite the fact that the potentiometers have parts that are a source of trouble and that have a tendency to fail, thus putting the motor out of service after a period of use. More recently there was developed a motor control utilizing a variable transformer, as shown by U.S. Pat. No. 3,469,164, which overcame the difficulties that had been found with the potentiometer type of control. The control utilizing a transformer operates very well and has met with acceptance, but there are considerations incidental to the use of a transformer that do place some limitations on the control. Through the novel concept of the present invention, it will be possible to construct an extremely effective motor control, utilizing photoelectric means that will completely eliminate need for a transformer or a conventional potentiometer in the control.

Accordingly, an object of the present invention is to provide a new and improved control for an electrical motor wherein the hereinabove discussed disadvantages are overcome by the provision of photoelectric means for producing a first control signal for controlling the speed of the electric motor and switch means for controlling the direction of rotation of the electric motor.

Another object of the present invention is to provide a new and improved control for an electric motor including first and second photoelectric means connected in series across a power supply, a light source for illuminating the photoelectric means, a movable mask for controlling the passage of light from the light source to the photoelectric means to thereby control the resistance of the photoelectric means, an output means connected across one of the photoelectric means for producing a first control signal for controlling the speed of the motor and the magnitude of which is dependent upon the resistances of the first and second photoelectric means, switch means for producing a second control signal for controlling the direction of rotation of the electric motor and actuating means for effecting movement of the mask to thereby control the magnitude of the first control signal and effecting actuation of the switch means to produce the second control signal.

Still another object of the present invention is to provide a new and improved control for an electric motor as defined in the next preceding paragraph wherein the switch means comprises first and second switches one of which is energized to effect rotation of the motor in one direction and the other of which is energized to effect rotation of the motor in the opposite direction, the actuating means comprises first and second shaft means one of which is associated with each of the switches to effect energization thereof and the mask includes an arcuate body portion having an opening therein through which light passes to illuminate the photoelectric means and a flange portion engageable with the shaft means to effect rotation of the body portion upon longitudinal movement of one of the shaft means.

A further object of the present invention is to provide a new and improved control device for use with a power supply and for producing first and second control signals and which includes a radiation source, radiation sensitive means connected across the power supply and having a resistance which varies with changes in the radiation intensity acting thereon from the radiation source, means for controlling the intensity of radiation acting on the radiation sensitive means, an output terminal associated with the radiation sensitive means for producing a first control signal the magnitude of which is dependent upon the resistance of the radiation sensitive means, and means, responsive to the means for controlling the intensity of radiation acting on the radiation sensitive means, for producing a second control signal.

Further objects and advantages of the present invention will become apparent from the following detailed description of a preferred embodiment thereof taken in conjunction with the following drawings wherein.

The present invention relates to a control for an electric motor and more specifically to a control for an electric motor for producing a first control signal for controlling the speed of the electric motor and a second control signal for controlling the direction of rotation of the electric motor. The control includes a pair of pushbuttons one of which is actuated to effect rotation of the motor in a first direction and the other of which is actuated to effect rotation of the motor in a second direction. Associated with each of the pushbuttons is a switch for producing a second control signal. When one of the pushbuttons is actuated, its associated switch is energized to initiate a second control signal to effect rotation of the motor in a predetermined direction. A pair of photocells is connected across a power source and a light source is provided to illuminate the photocells. A movable mask is associated with the photocells and the pushbuttons and controls the intensity of the light passing from the light source to the photocells. The mask is movable in response to movement of the pushbuttons and the position of the mask is dependent upon the longitudinal movement of the pushbuttons. The intensity of light acting on the photocells controls the resistance thereof and hence movement of the mask by one of the pushbuttons controls the resistance of the photocells. An output is connected across one of the photocells and the magnitude of the output signal initiating therefrom is dependent upon the resistances of the photocells. Therefore, movement of one of the pushbuttons effects movement of the mask to thereby control the resistances of the photocells and the magnitude of the output signal which controls the speed of the motor while at the same time energizing the switch associated with that pushbutton to effect rotation of the motor in a predetermined direction.

Figure 1:
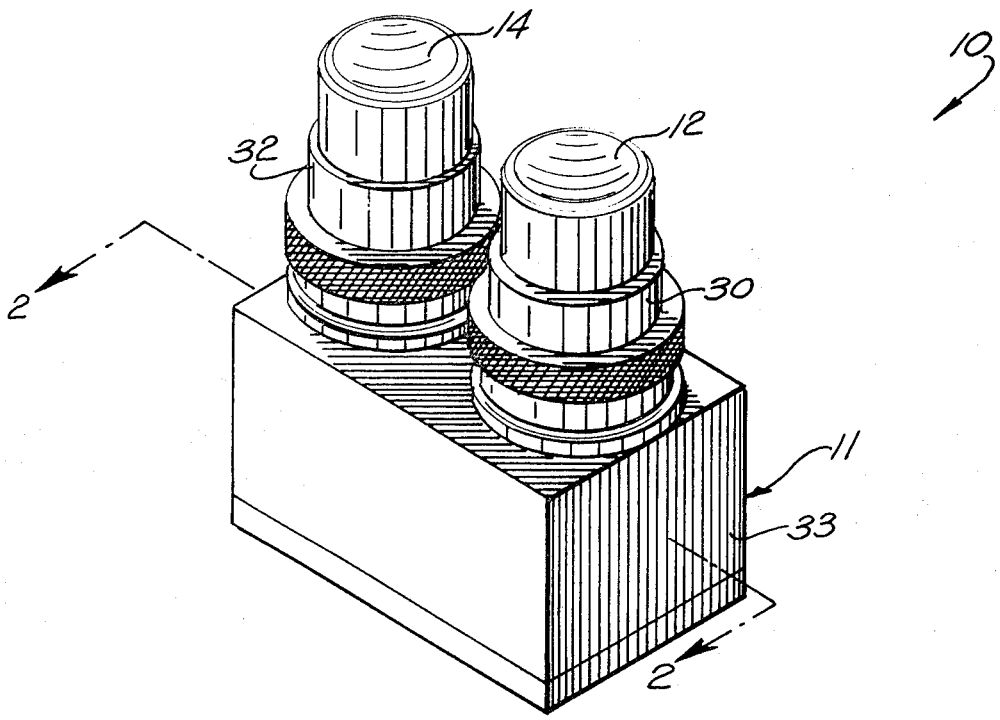
FIG. 1 is a perspective view of a preferred embodiment of the present invention.

As illustrated in FIG. 1 a control 10 for an electric motor includes a housing 11 and a pair of pushbutton actuators 12 and 14. The pushbutton 12 is operable upon movement thereof, inwardly of the housing 11, to effect rotation of a motor (not illustrated) in one direction and the pushbutton 14 is operable upon movement thereof inwardly of the housing 11 to effect rotation of the motor in a direction opposite to the rotation of the motor effected by actuation of pushbutton 12.

Figure 2:
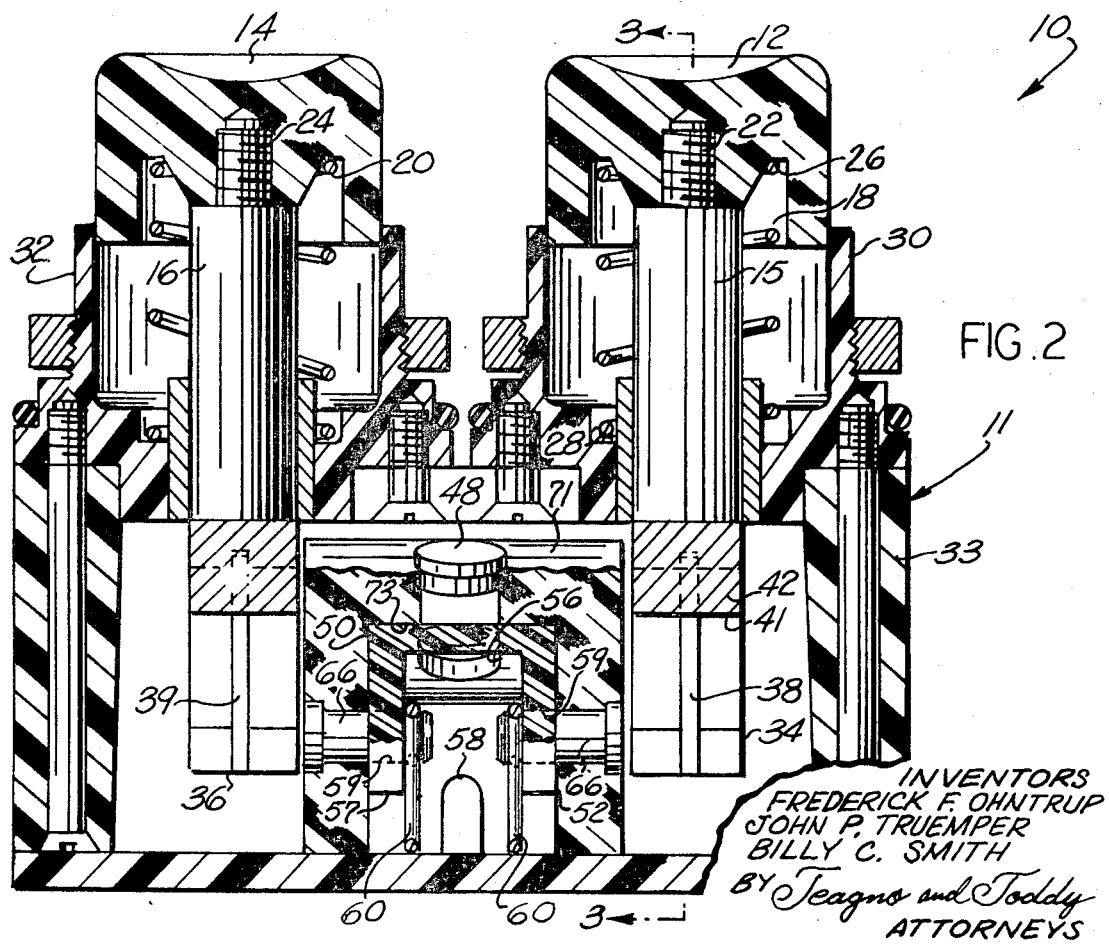
FIG. 2 is a cross-sectional view taken along the lines 2—2 of FIGS. 1 and 3 and illustrating the cooperation between the pushbuttons, the movable mask and the switches.

As illustrated in FIG. 2 the housing 11 includes a pair of upper projecting portions 30 and 32 and a lower portion 33. The pushbutton 12 is associated with and movable into the upper portion 30 of the housing and the pushbutton 14 is associated with and movable into the upper portion 32 of the housing. The pushbutton 12 is connected to a shaft 15 by means of a threaded portion 22 and the pushbutton 14 is connected to a shaft 16 by means of a threaded portion 24. A spring 18 is disposed between a shoulder 26 on the pushbutton 12 and a shoulder 28 located on the upper portion of the housing 30. The spring 18 acts to bias the pushbutton 12 and the shaft 15 outwardly from the housing 11. A similar spring 20 is associated with the pushbutton 14 and acts in an analogous manner to bias the pushbutton 14 and shaft 16 outwardly from the housing 11.

Figure 3:
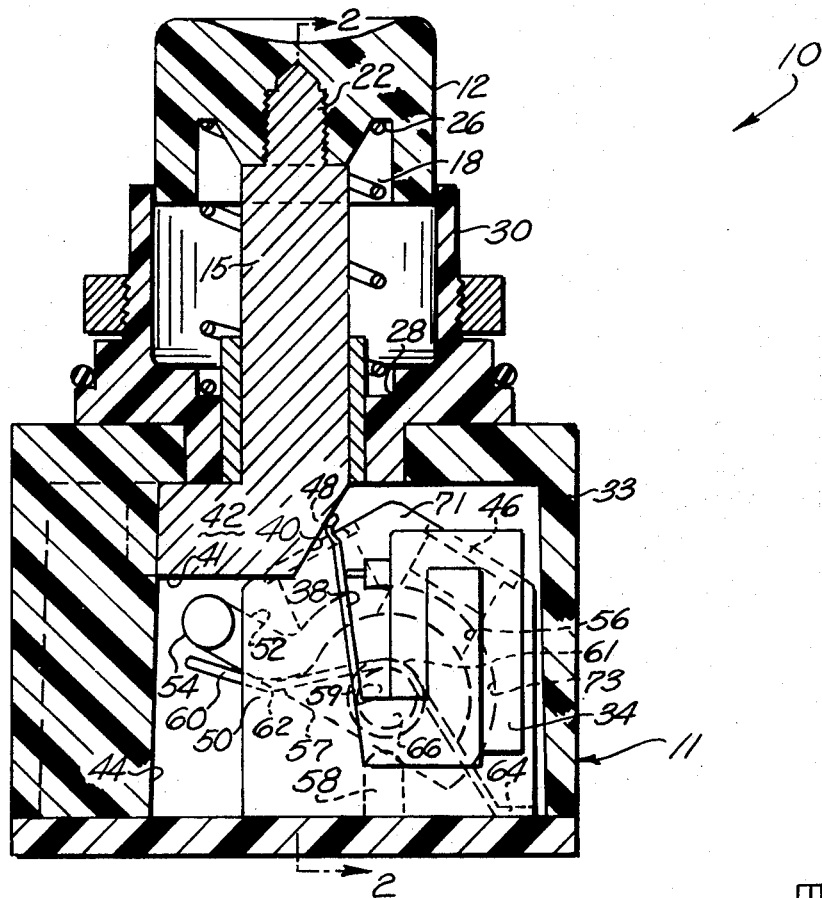
FIG. 3 is a cross-sectional view taken along the line 3—3 of FIG. 2 more fully showing the cooperation between the switch, the movable mask and the photocells.
Figure 6:
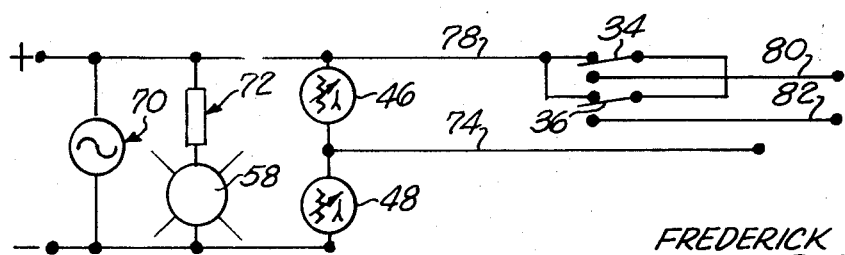
FIG. 6 is a schematic drawing of the circuitry associated with the present invention.

A pair of miniature switches 34 and 36 is mounted in the power portion 33 of the housing 11. The switch 34 includes an arm portion 38 to effect actuation thereof and the switch 36 includes an arm portion 39 to effect actuation thereof. Actuation of the switches 34 and 36 is effected by longitudinal movement of the shaft members 15 and 16 inwardly of the body 11. As is illustrated in FIG. 3, the shaft 15 includes a cammed portion 40 which upon downward movement of the shaft 15 effects movement of the arm 38 of the switch 34 to thereby energize the switch 34. The shaft 26 has a similar cam portion thereon which cooperates with the arm 39 of switch 36 to thereby effect actuation of the switch. The pushbuttons 12 and 14 are independently actuatable and it should be apparent that actuation of the pushbutton 12 will effect energization of the switch 34 and actuation of the pushbutton 14 will effect energization of the switch 36. Suitable means, illustrated schematically in FIG. 6, are provided to enable only one of the switches 34 or 36 to be energized at a time. The switches are connected to the motor by circuitry schematically illustrated in FIG. 6 and energization of the switch 34 effects rotation of the motor in a first direction and energization of the switch 36 effects energization of the motor in a second direction opposite to the first direction. The configuration of the cam associated with each of the shafts 15 and 16 is such that initial movement of one of the pushbuttons 12 and 14 will effect energization of the switch associated therewith.

A pair of radiation-sensitive cells 46 and 48 are disposed within the lower portion 33 of housing 11. The cells 46 and 48 are preferably of the photoelectric type and have a resistance which is dependent upon the intensity of light acting thereon. A support member 71 is disposed in the lower portion of the housing 11 and securely positions the photocells 46 and 48 therein. A radiation source, which in the preferred embodiment is a light source, 58, is also located in the lower portion 33 of the housing 11 to effect illumination of the photocells 46 and 48.

Figure 5:
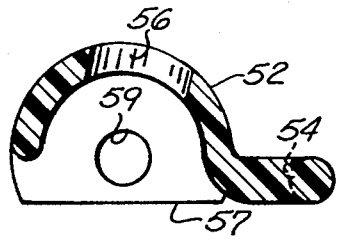
FIG. 5 is a side view of the mask taken approximately along the lines 5—5 of FIG. 4.
Figure 4:
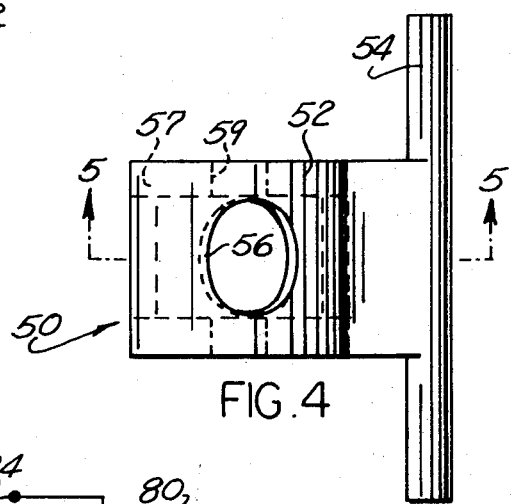
FIG. 4 is an enlarged planar view of the mask for controlling the illumination on the photocells.

A movable mask member 50 is disposed between the light source 58 and the photocells 46 and 48. The mask member 50, which is more fully illustrated in FIGS. 4 and 5, includes an arcuate portion 52 and a flange portion 54 which in the present embodiment is in the shape of a rod or bar. The arcuate portion 52 has an opening 56 disposed therein which enables light to pass from the light source 58 to the photocells 46 and 48. The mask includes a pair of plate portions 57 having openings 59 therein which cooperate with the pivot pins 66 to support the mask 50 for movement within the housing 11. The portion 52 of mask 50 is held contiguous to arcuate surface portion 73 of the support member 71, by the pivot pins 66. A return spring 60 bias the mask member 50 in a counterclockwise direction as viewed in FIG. 3. The return spring 60 has one end portion 62 which engages a shoulder on the mask 50. The opposite end 64 of the spring 60 engages with the bottom portion of the housing 11. The spring 60 is held in place by the pair of pivot pins 66 which engage with the center portion 61 of the spring 60 to enable the spring 60 to exert a biasing force in a counterclockwise direction as is illustrated in FIG. 3, against the mask member 50. The mask member 50 is rotatable along the surface portion 73 in a clockwise direction against the biasing force of the spring 60.

Each of the shaft members 15 and 16 include a lower surface portion 41 which is engageable with the flange portion 54 of the mask 50. As is illustrated in FIG. 3, the shaft member 15 includes a lower surface portion 41 thereof which upon longitudinal movement of the shaft 15 in a downwardly direction will engage with the flange 54 of the mask 50 to thereby effect rotation of the mask 50 in a clockwise direction. Each of the shafts 15 and 16 include a butt portion such as the butt portion 42 of the shaft 15 which is operable to slide on one of a pair of guide flanges 44 disposed in the housing 11. The butt portions of the shafts prevent rotation of the shafts so as to maintain the lower portions of the shaft in position to engage with the flange portion 54 and the cam portions in position to engage with the arms 38 and 39 of the switches 34 and 36.

Rotation of the mask member 50 in a clockwise direction causes the opening 56 in the arcuate portion 52 thereof to move to decrease the illumination acting on the photocell 46 and increase the illumination acting on the photocell 48. Accordingly, the resistance of the photocell 46 will increase while the resistance of the photocell 48 will decrease due to a greater light intensity acting thereon than when the mask 50 is in its initial position as illustrated in FIG. 3. It should therefore be apparent that the magnitude of the longitudinal movement of the shaft 15 or the shaft 16 will control the resistances of the photocells 46 and 48.

The photocells 46 and 48, as is schematically illustrated in FIG. 6, are series connected across a suitable power supply 70. Connected parallel to the photocells 46 and 48 across the power supply 70 is a resistor 72 and the light source 58. An output terminal or lead 74 is connected to the junction between the photocells 46 and 48. The switches 34 and 36 are also connected to the power source 70 by means of a lead 78. A pair of leads 80 and 82 extend from the switches 34 and 36 respectively and energization of the switch 34 will effect energization of the lead 80 and energization of the switch 36 will effect energization of the lead 82. The leads 80 and 82 may be connected to an electrical motor by a control circuit in a well known manner and when the lead 80 is energized the motor will rotate in one direction and when the lead 82 is energized the motor will rotate in the opposite direction. It should be appreciated that the switches 34 and 36 are connected so that only one of the leads 80 and 82 may be energized at a time. If both switches are simultaneously energized, current will be prevented from flowing along either lead 80 or 82.

The photocells 46 and 48 form a potentiometer or bridge type circuit across the power source 70. The voltage between the output leads 74 and 80 or 82, dependent upon which switch 34 or 36 is energized, will be dependent upon the resistances of the photocells 46 and 48 in a well-known manner. When the resistance of photocell 46 is increased by decreasing the illumination thereon the voltage drop between the leads 74 and 80 or 82 will increase and when the resistance of photocell 48 increases, due to decreasing the light intensity acting thereon, the voltage drop between the lead 74 and 80 or 82 will decrease. Hence the magnitude of the voltage between the leads will be dependent upon the resistances of the photocells 46 and 48 and the magnitude of this voltage will be utilized to control the speed of the motor.

Rotation of the mask 50 will cause the resistance of one of the photocells to increase while the same time decreasing the resistance of the other photocell. Accordingly, it should be appreciated that actuation of one of the pushbuttons 12 or 14 will control the position of the mask 50 which will in turn control the resistances of the photocells 46 and 48 to thereby control the output signal developed between the leads 74 and 80 or 82.

The leads 74, 80 and 82 can be connected to suitable circuitry for sensing the magnitude of the voltage developed therebetween to control the speed of the motor. Suitable circuitry for controlling the speed of the motor is disclosed in the Smith et al. U.S. Pat. No. 3,402,335 filed Sept. 17, 1968 and assigned to the same assignee as the present invention. The Smith et al. patent discloses a reversible induction motor hoist control and while the present invention may be utilized for controlling many different types of electrical motors it should be appreciated that the invention herein is specifically adaptable to control the speed and direction of a reversible induction hoist motor. The control can be utilized to control the direction of rotation of the hoist motor i.e., the raising or lowering of the hoist and control the speed of the motor.

Initial actuation of one of the pushbuttons 12 and 14 will effect energization of one of the switch members 34 or 36 to thereby control the direction of rotation of the motor.

In the preferred embodiment of the present invention the initial displacement of one of the buttons to energize its associated switch is preferably about three thirty-seconds of an inch and further displacement past the three thirty-seconds of an inch mark will provide the infinite variable speed control with the speed of the hoist motor being proportional to the displacement of the button. The further displacement of the pushbutton will effect engagement of the shaft associated with the pushbutton with the mask means to thereby vary the resistances on the photocells 46 and 48. Increased rotation of the mask 50 will effect an increase in the speed of the motor. Thus, by pushing one of the pushbuttons the operator not only controls the directions of rotation of the motor but he can also control the speed increasing the speed by further depressing the button or decreasing the speed by letting the button more outwardly from the body under the action of the spring.

It should be appreciated that only 5 wires are required to extend from the housing 11 to circuitry for controlling the motor. This is a large improvement over those types of controllers that require a large quantity of wires. Accordingly, ease in assembly and a lowering in costs is provided by the present invention. Moreover, once the control is assembled there is no adjustment required for efficient operation such as normally found in the variable transformer type of controller and no special frequencies are required for operation. Furthermore, since mechanical wear of the photocells 46 and 48 occur the life of the circuitry associated with the control is increased over that wherein a conventional potentiometer or resistance bridge is used.

From the foregoing, it should be apparent that a new and improved control for an electric motor has been provided and one which is especially adapted for use with a reversible induction hoist motor. The control includes a pair of pushbuttons and a pair of switches one of which is associated with each of the pushbuttons. Initial actuation of one of the pushbuttons effects energization of one of the switches associated therewith to thereby determine the direction of rotation of the motor. The control also includes a pair of photocells series connected across a power supply and a light source for illuminating the photocells. A mask member is associated with the pushbuttons and movable therewith to control the intensity of light acting on each of the photocells to thereby control the resistance of the photocells. Actuation of the pushbuttons after initially effecting energization of its associated switch will effect rotation of the mask member to thereby vary and control the intensity of light acting on the photocells. Connected across one of the photocells is an output terminal which has a first control signal initiated therefrom the magnitude of which is dependent upon the position of the mask member and the resistances of the photocells. The magnitude of the first control signal is used to control the speed of the motor. Thus, a simple, inexpensive control for an electric motor has been provided which is operable to control the direction of rotation of the motor and the speed of the motor.

We claim:

1. A control for an electric motor for producing a first signal for controlling the speed of the motor and a second signal for controlling the direction of rotation of the motor comprising a housing, first and second photoelectric means mounted in said housing and connectable in series across a power supply, a light source for illuminating said first and second photoelectric means, said first and second photoelectric means having a resistance which varies in response to changes in the light intensity acting thereon, movable mask means for controlling and varying the passage of light from said light source to said first and second photoelectric means to thereby vary the resistance of said first and second photoelectric means, output means connected across one of said photoelectric means for providing a first control signal, the magnitude of which is dependent upon the resistance of said first and second photoelectric means, switch means for producing a second control signal for controlling the direction of rotation of the electrical motor, actuation means operatively associated with said switch means for effecting actuation thereof and initiation of said second control signal and with said mask means for positioning said mask means relative to said photoelectric means to thereby control the magnitude of said first control signal.

2. A control for an electric motor as defined in claim 1 wherein said switch means comprises first and second switches, and said actuation means comprises first and second movable actuating members, said first actuating member being movable to effect actuation of said first switch and initiation of said second control signal to effect rotation of the electric motor in a first direction and said second actuating member being movable to effect actuation of said second switch and initiation of said second control signal to effect rotation of the electric motor in a second direction.

3. A control for an electric motor as defined in claim 2 wherein initial movement of each of said actuating members effects actuation of said switch associated therewith and further movement of each of said actuating members effects movement of said mask means to control said first control signal, said further movement of each of said actuating members being through a predetermined path, said output means providing said first control signal with a magnitude which controls the speed of the motor and wherein the magnitude of the first control signal is proportional to the displacement of each of said actuating members through said predetermined path from an initial position to thereby provide an infinite variable speed control for the motor.

4. A control for an electric motor as defined in claim 2 wherein said housing includes a chamber, said first and second photoelectric means being disposed in said chamber, said mask means comprises a mask member having an arcuate portion and a flanged portion extending from one end of said arcuate portion, said arcuate portion having an opening therein for enabling light to pass from said light source to said first and second photoelectric means, and wherein said first and second actuating members upon movement thereof engage with said flanged portion of said mask member and effect rotation of said arcuate portion and said opening to thereby vary the position of the opening and the light intensity acting on said photoelectric means.

5. A control for an electric motor as defined in claim 4 wherein said first and second actuating members comprise first and second longitudinally movable shafts, respectively, said shafts having one end portion thereof which engages said flanged portion of said mask member, so that longitudinal movement of one of said shafts effects movement of said flanged portion and movement of said opening in said mask member to a position which is dependent upon the magnitude of longitudinal movement of said shaft, said one end portion of each of said shafts having cam means disposed thereon for engaging with and effecting actuation of said switch associated therewith upon initial movement of said shaft.

6. An apparatus for use with a power source having a substantially constant output and for producing a plurality of control signals comprising a housing, radiation sensitive means mounted in said housing, radiation source mounted in said housing for radiating on said radiation sensitive means, said radiation sensitive means being connectable across the power source and effecting an output which varies with changes in the radiation intensity acting thereon from said radiation source, means for controlling the intensity of radiation acting on said radiation sensitive means, actuator means for controlling said means for controlling the intensity of radiation acting on said radiation sensitive means, an output terminal connected to said radiation sensitive means for producing a first control signal the magnitude of which is dependent upon said output of said radiation sensitive means and means responsive to said actuator means for producing a second control signal.

7. An apparatus as defined in claim 6 wherein said radiation sensitive means comprises first and second photoelectric cells connectable in series across said power source.

8. An apparatus as defined in claim 7 wherein said actuator means includes first and second actuator members movable from an initial position through a predetermined path, said movable actuator members controlling said means for controlling the intensity of radiation acting on said first and second photocells and the magnitude of said first control signal and wherein the magnitude of said first control signal is proportional to the displacement of one of said actuator members from said initial position along said predetermined path.

9. An apparatus as defined in claim 8 wherein said means responsive to said actuator means includes first and second switch means, said first switch means being associated with said first actuator member and operable upon displacement of said first actuator member from said initial position to produce a second control signal and said second switch means being associated with said second actuator member and operable upon displacement of said second actuator member from said second position to produce a second control signal.

10. An apparatus as defined in claim 9 wherein said means for controlling the intensity of radiation acting on said radiation sensitive means is a movable mask member having an opening therein for directing radiation from said radiation source to said first and second photocells, the amount of radiation being directed to each of said photocells being dependent upon the position of said movable mask member, said first and second actuator members controlling the position of said mask member.

* * * * *